US008459206B1

(12) United States Patent
Colvin

(10) Patent No.: US 8,459,206 B1
(45) Date of Patent: Jun. 11, 2013

(54) FEED PORT FOR A BIRD FEEDER

(75) Inventor: Barry D. Colvin, Bristol, RI (US)

(73) Assignee: Aspects, Inc., Warren, RI (US)

( * ) Notice: Subject to any disclaimer, the term of this patent is extended or adjusted under 35 U.S.C. 154(b) by 767 days.

(21) Appl. No.: 12/484,315

(22) Filed: Jun. 15, 2009

Related U.S. Application Data

(60) Provisional application No. 61/074,385, filed on Jun. 20, 2008, provisional application No. 61/085,038, filed on Jul. 31, 2008.

(51) Int. Cl.
*A01K 39/01* (2006.01)
(52) U.S. Cl.
USPC ........................................................ 119/57.8
(58) Field of Classification Search
USPC ............... 119/52.2, 52.3, 57.8, 57.9, 429, 53, 119/531, 60, 61.5, 61.54, 61.55
See application file for complete search history.

(56) References Cited

U.S. PATENT DOCUMENTS

| 5,323,733 | A | * | 6/1994 | Youngs-McVicker | ........ 119/464 |
| 6,681,718 | B1 | * | 1/2004 | McIlarky | ........................ 119/53 |
| D612,108 | S | * | 3/2010 | Torres et al. | ................. D30/124 |
| 2005/0211177 | A1 | * | 9/2005 | Bescherer | .................... 119/57.8 |
| 2006/0180088 | A1 | * | 8/2006 | Nock | ............................ 119/57.8 |
| 2006/0207512 | A1 | * | 9/2006 | Fort, II | ......................... 119/57.8 |
| 2006/0266296 | A1 | * | 11/2006 | Nock | ............................ 119/57.8 |
| 2007/0227453 | A1 | * | 10/2007 | Puckett et al. | ............... 119/57.8 |

* cited by examiner

*Primary Examiner* — Rob Swiatek
*Assistant Examiner* — Lisa Tsang
(74) *Attorney, Agent, or Firm* — Barlow, Josephs & Holmes, Ltd.

(57) ABSTRACT

A feed port for a bird feeder is disclosed. The feed port includes a body portion having a number of edges defining a first opening through the body portion. A shroud extends from the body portion and depends downwards forming a space rear of the first opening. The shroud further defines a second opening in fluid connection with the first opening. An obstruction extends across the second opening.

16 Claims, 10 Drawing Sheets

FEED PORT FOR A BIRD FEEDER

CROSS-REFERENCE TO RELATED APPLICATIONS

The present patent document claims priority to earlier filed U.S. Provisional Patent Application Ser. No. 61/074,385, filed Jun. 20, 2008, and U.S. Provisional Patent Application Ser. No. 61/085,038, filed Jul. 31, 2008, the entire contents of which are incorporated herein by reference.

BACKGROUND OF THE INVENTION

1. Field of the Invention

The present invention relates generally to bird feeders and more specifically to an improved side port for a tubular bird feeder that includes at least one center post to narrow or bisect the feed port openings.

2. Background of the Related Art

Tubular bird feeders are well known in the art. Tubular bird feeders generally include a tubular body with a sidewall for holding bird feed. At various points on the sidewall, a number of apertures are formed through the sidewall and into the tubular body. A number of feed ports are coupled to the sidewall at each of the respective apertures. Prior art feed ports include a body portion that generally includes a perch for the bird to land upon and an opening into the tubular body of the bird feeder. The body portion also includes a skirt or shroud that prevents the bird feed from simply draining out of the tubular body of the bird feeder through the opening on the feed port. In effect, the shroud acts as a baffle for the feed.

There have been many seed "blends" introduced to the market place over the past several years for feed. Smaller openings on the feed port usually can cause a problem with seed because the seed is hygroscopic. The seed will absorb moisture and swell or stick together, which will in turn prevent seed flow to the openings. A wider opening on the feed port allows the seed to flow easier than the conventional smaller openings thereby allowing birds to eat.

However, wider openings also suffer from several disadvantages. First, it is possible for smaller birds and fledglings of larger birds to have their heads become stuck in the feed port when the feed falls at or below the shroud or skirt. This situation occurs because the birds must insert their entire head into the feed port in order to reach the feed, which is falling out of reach as the supply of feed dwindles. In particular, the feathers on the bird lie flat as the bird inserts its head into the feed port, but resists the bird from withdrawing its head because the feathers "stand up" and get caught on the shroud and opening of the feed port. Accordingly, there is a need in the art for a feed port that prevents smaller birds from getting their heads stuck in the fee port.

Second, the wider openings on these feed ports also allow larger birds to spill seed easily out of the bird feeder. In particular, larger birds tend to move their beaks from side to side in order to pick through the seeds. As the bird moves its beak from side to side, seed is inadvertently spilled out of the bird feeder. Accordingly, there is a perceived need in the prior art to prevent larger birds from spilling seed out of bird feeders with feed ports that have wider openings.

SUMMARY OF THE INVENTION

The present invention solves the problems of the prior art by providing a feed port for a bird feeder that includes an obstruction, such as a center post, that reduces the opening of the feed port between the lip of the opening and the shroud. The obstruction prevents smaller birds from being able to insert their heads below the shroud of the feed port and also prevents larger birds from moving their heads easily from side to side. As a consequence, smaller birds will not inadvertently become stuck in the feed and larger birds will not waste seed by spilling it onto the ground.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
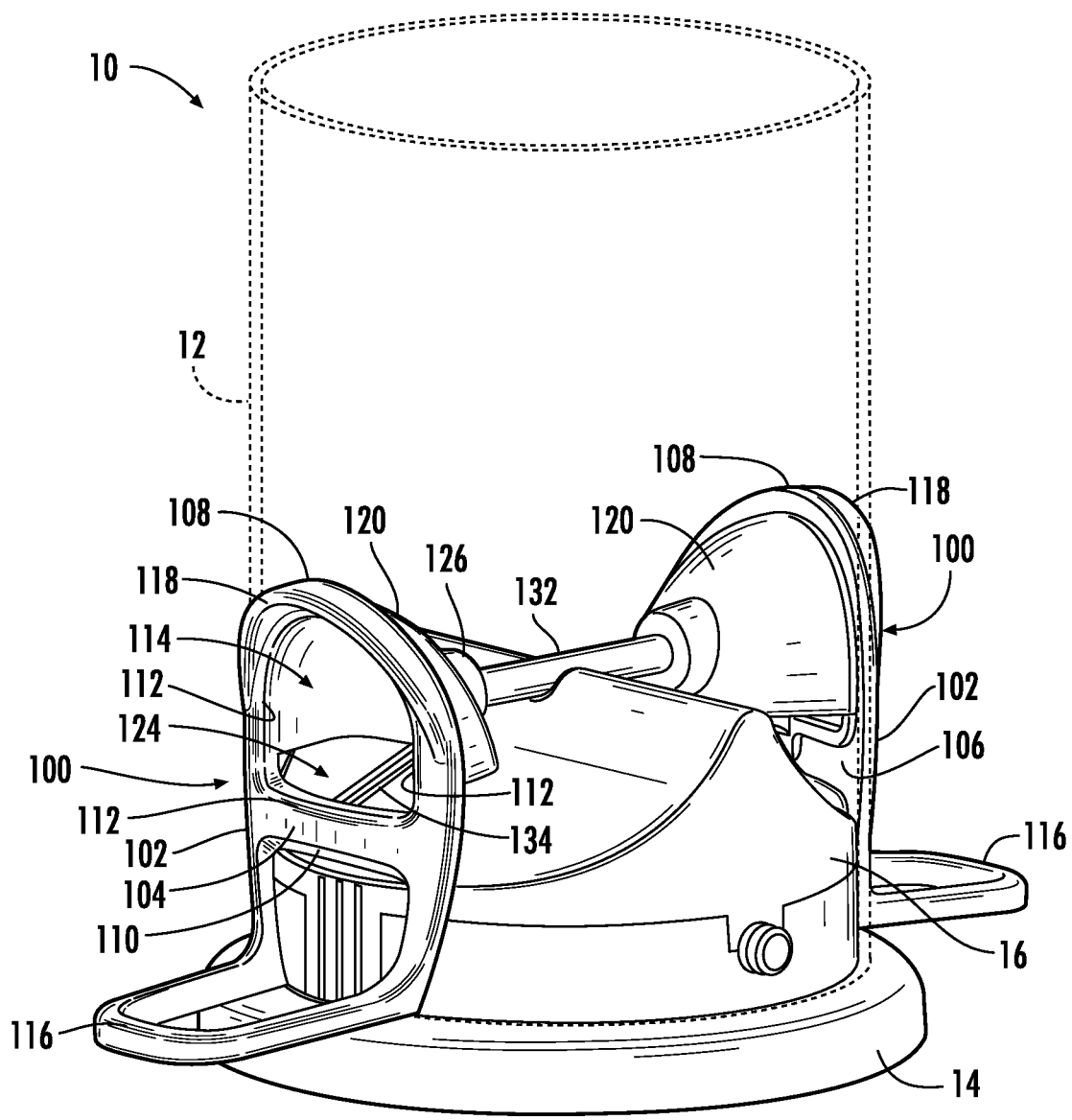
FIG. 1 is perspective view of a bird feeder showing the preferred embodiment of the feed port of the present invention, the sidewall being shown in broken lines so as not to obscure the interior of the bird feeder.

Referring now to FIG. 1, the preferred embodiment of the feed port 100 of the present invention is shown installed on a tubular bird feeder 10. The tubular bird feeder 10 includes a sidewall 12 (shown in broken lines so as not to obscure the interior of the bird feeder 10) with an open top and bottom end. Inserted into the open bottom end of the feeder 10 is a base portion 14 that includes a seed deflector 16. The seed deflector 16 guides seed towards the feed ports 100. The base portion 14 may be secured to the open bottom end of the feeder 10 by any number of techniques known in the art. For instance, fasteners such as rivets and screws may be used. Alternatively, latching mechanism such as spring buttons or clips may be used. Furthermore, the bird feeder 10 may include a top cap (not shown) to close the open top end. The top cap may be secured to the open top end in any manner known in the art.

The sidewall 12 includes apertures to which the feed ports 100 are coupled. Although only two feed ports 100 are shown at the bottom of the tubular bird feeder 10, it is important to note that a number of feed ports 100 may be provided at various points on the length of the sidewall 12 of the tubular bird feeder 10.

Referring now to FIGS. 2A, 2B, 3A, 3B, 4, 5A and 5B, the preferred embodiment of the feed port 100 of the present invention generally includes a body portion 102. The body portion 102 has front and rear faces 104, 106, a top portion 108 and a bottom portion 110. The body portion is further configured to have a number of edges 112 that define a first opening 114 through the body portion 102 of the feed port 100.

Extending from the front face 104 and bottom portion 110 of the body portion 102 is a perch 116. The perch 116 is preferably configured as a loop to allow larger birds to feed while facing the tubular feeder 10. Alternatively, a post (not shown) may be used instead of a loop perch.

Extending from the front face 104 and top portion 108 of the body portion 102 of the feed port 100 is a lip 118 configured to deflect rain, dew, and water on the sidewall 12 of the tubular bird feeder 10 generally, from entering the first opening 114 of the feed port 100 and spoiling the seed contained therein.

Figure 3B:
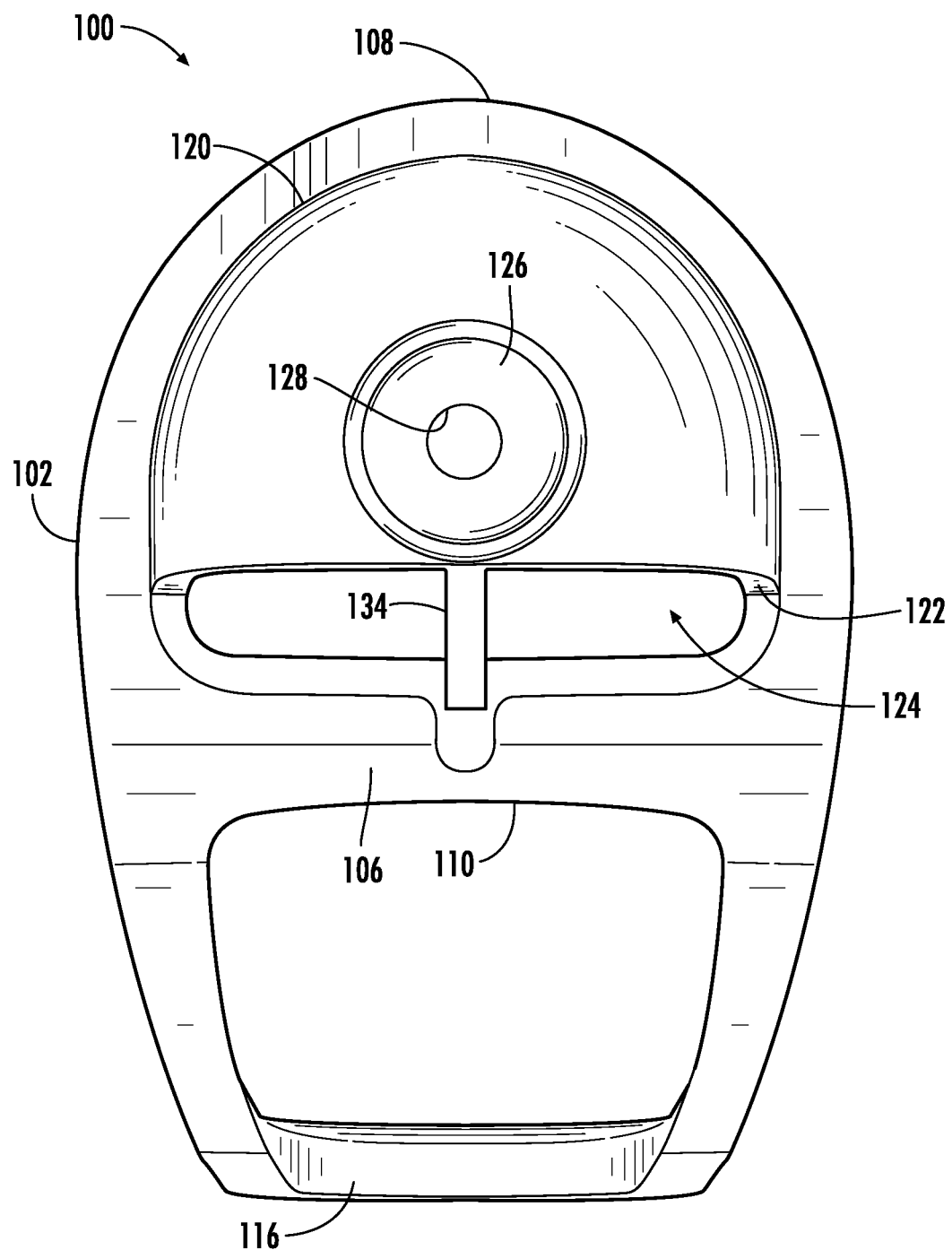
FIG. 3B is a rear view of the preferred embodiment of the feed port of the present invention.
Figure 4:
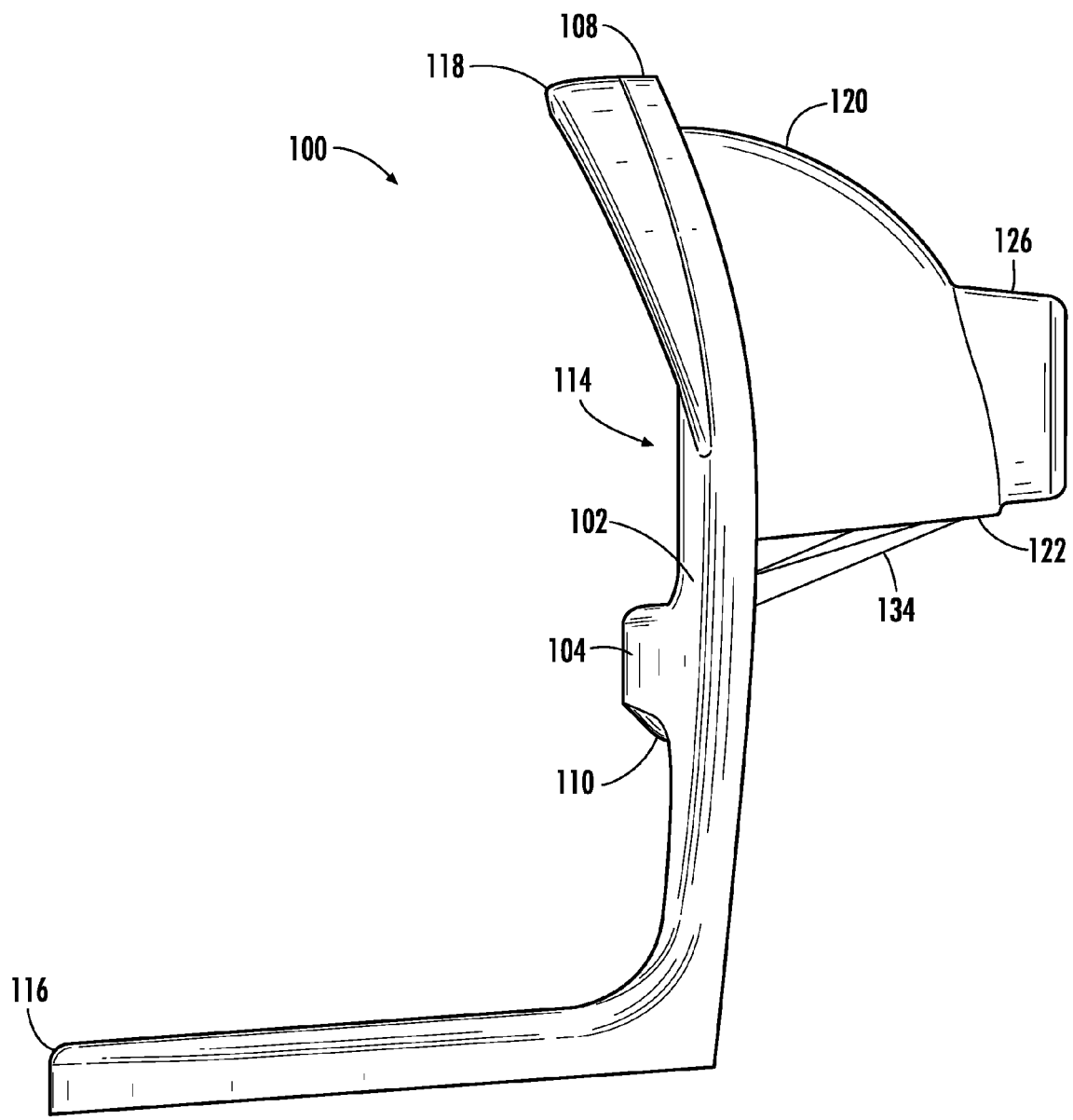
FIG. 4 is a right side view of the preferred embodiment of the feed port of the present invention, it being understood that the left side view is the mirror image thereof.

Extending from the rear face 106 and depending from the top portion 108 of the body portion 102, is a shroud 120. The shroud 120 terminates in a bottom edge 122 prior to depending the full length of the first opening 114, which is best seen in FIGS. 3B and 4. The bottom edge 122 of the shroud and bottom-most edge 112 of the body portion 102 define a second opening 124. The shroud 120 is preferably curved to allow seed to easily flow around it. However, it may also include a number of contiguous flat, sloped surfaces.

Figure 2A:
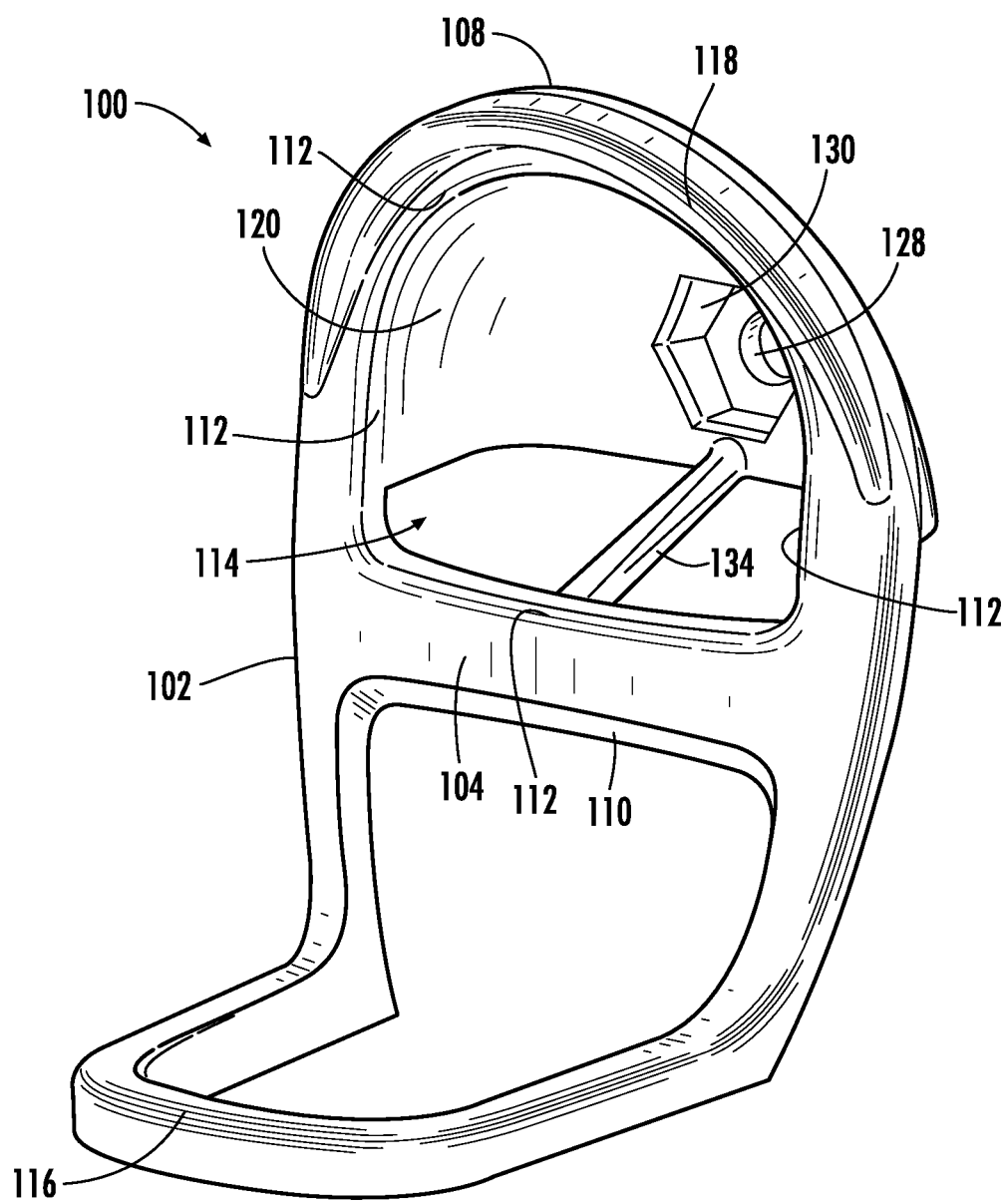
FIG. 2A is a front perspective view of the preferred embodiment of the feed port of the present invention.
Figure 2B:
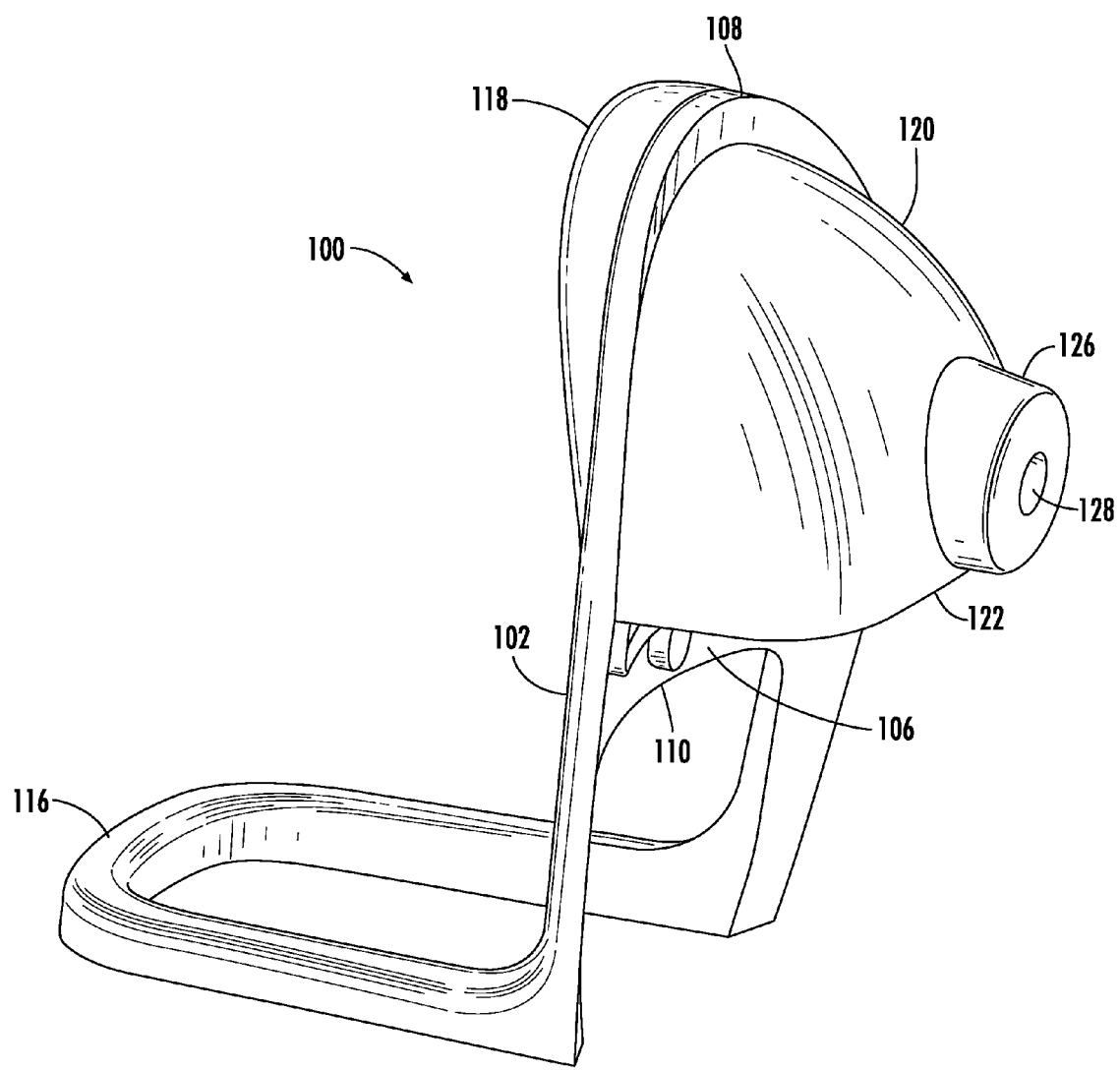
FIG. 2B is a rear perspective view of the preferred embodiment of the feed port of the present invention.
Figure 3A:
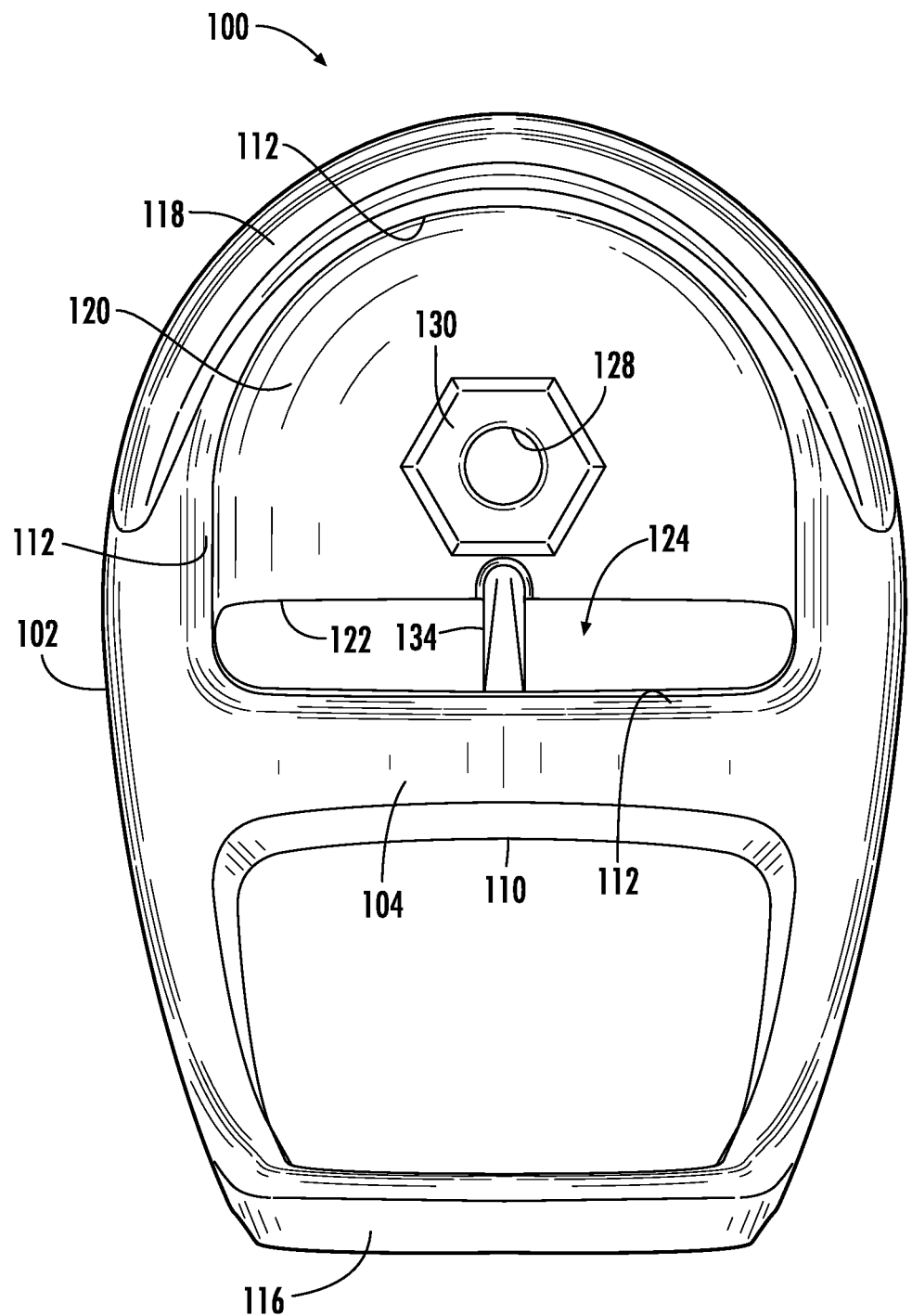
FIG. 3A is a front view of the preferred embodiment of the feed port of the present invention.

Referring to FIGS. 2A and 3A, projecting rearward from the shroud is a raised boss 126 with an aperture 128 formed therethrough. Opposite the boss 126 on the interior of the shroud 120, a hex key 130 is formed. Referring back now to FIG. 1, a rod 132 extends between two feed ports 100, located opposite one another, and the ends of the rod 132 extend into each aperture 128 on the boss 126 of each feed port 100. The ends of the rod 132 are secured within each hex key 130 thereby retaining the feed ports 100 within the tubular bird feeder 10.

Figure 5A:
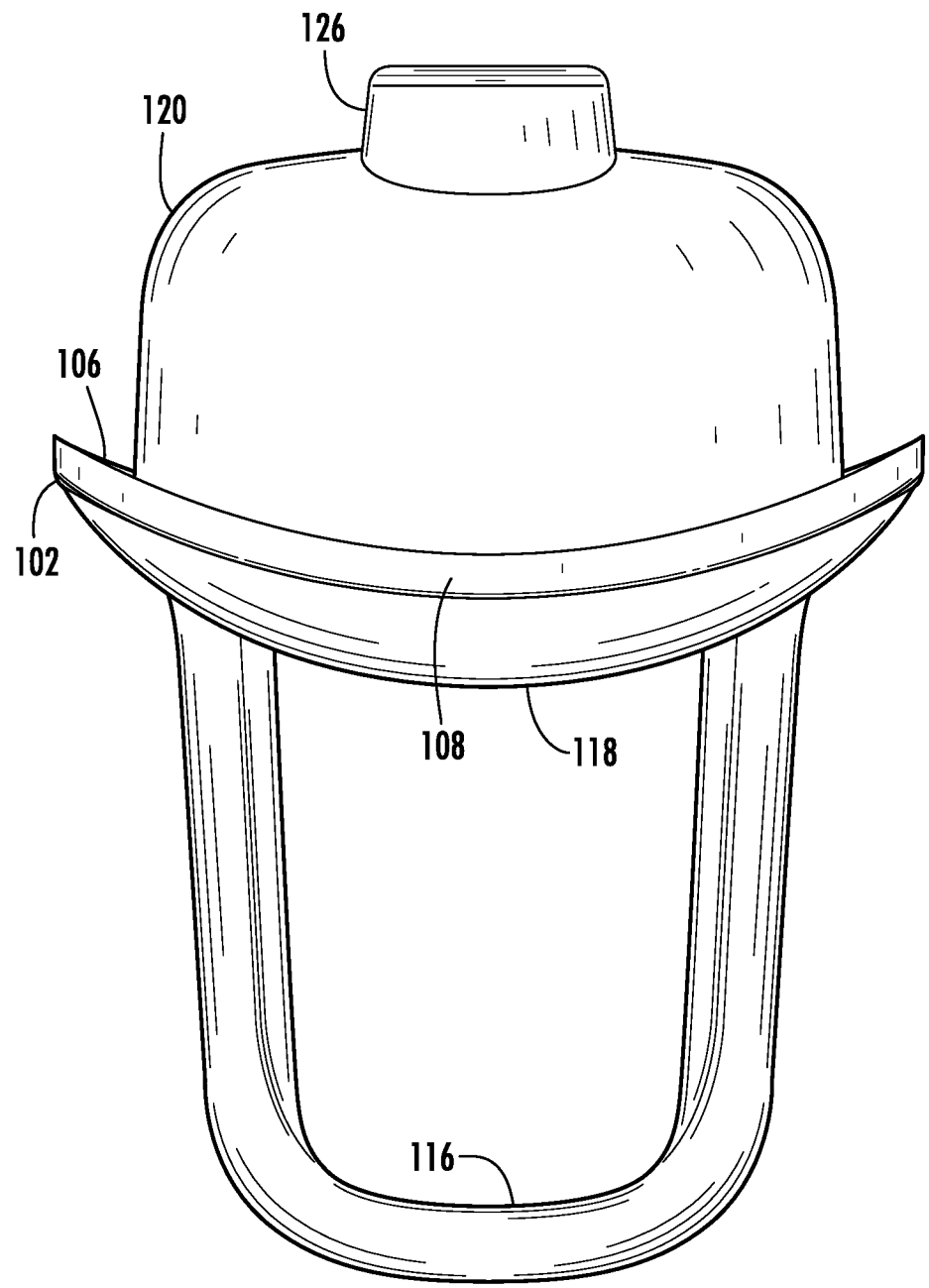
FIG. 5A is a top view of the preferred embodiment of the feed port of the present invention.
Figure 5B:
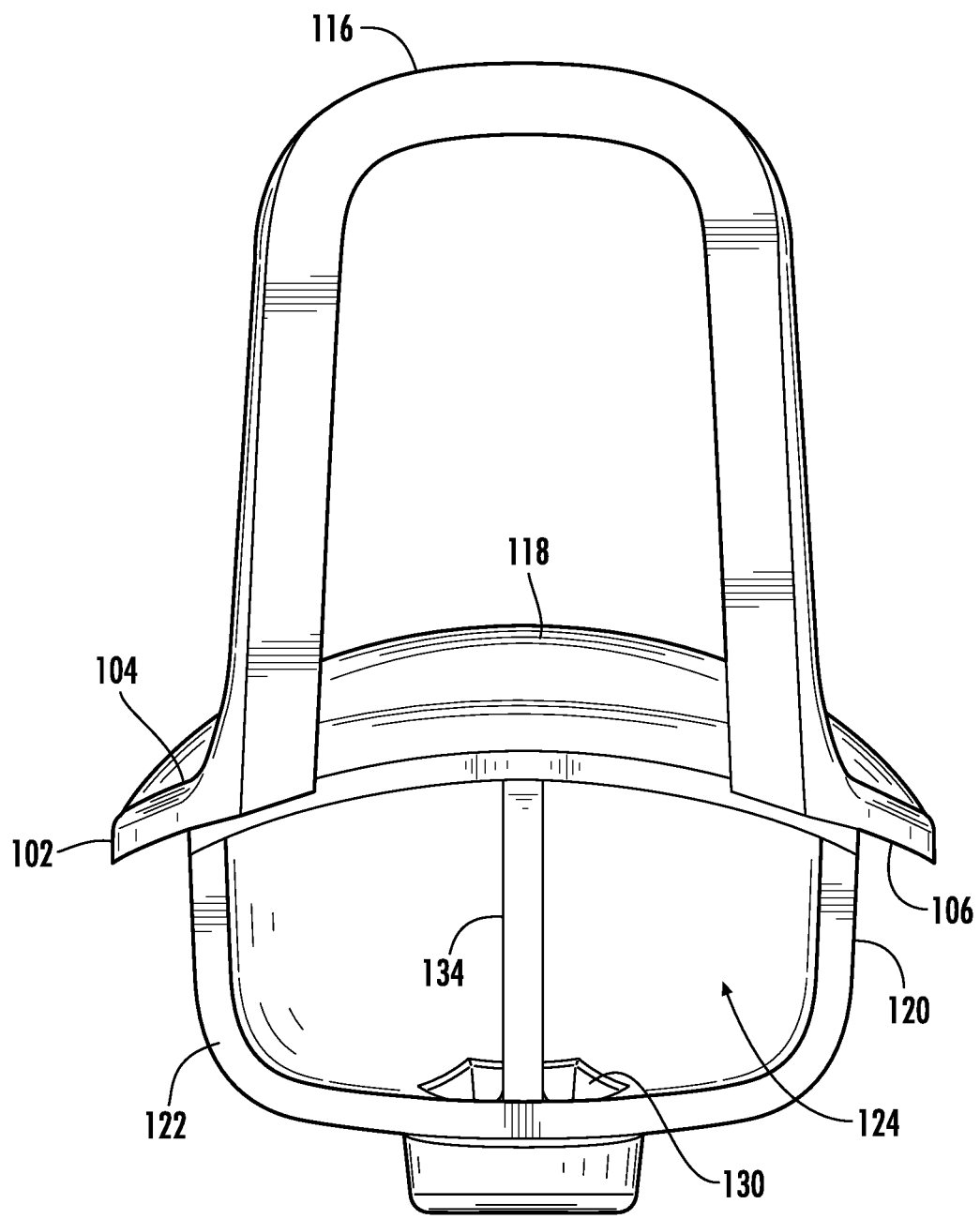
FIG. 5B is a bottom view of the preferred embodiment of the feed port of the present invention.

A center post 134 bisects the second opening 124 and is connected to the shroud 120 and the rear face 106 of the body portion 102 of the feed port 100, best seen in FIGS. 3A, 3B and 5B. The center post 134 prevents larger birds from moving their beaks from side to side by obstructing the bird's beak. Because the larger bird cannot move its beak from side to side it will pick seed from either side of the center post 134 as if it were a smaller opening feed port. As a consequence, less seed is spilled out of the bird feeder 10 and onto the ground. Also, the center post 134 obstructs the second opening 124 sufficiently that smaller birds are unable to insert their heads through the second opening. This feature prevents the smaller birds and fledglings from becoming stuck on the bottom edge 122 of the shroud 120. Because the feed port 100 has larger openings, it allows newer seed blends to flow to the feed port 100 without binding.

Figure 6:
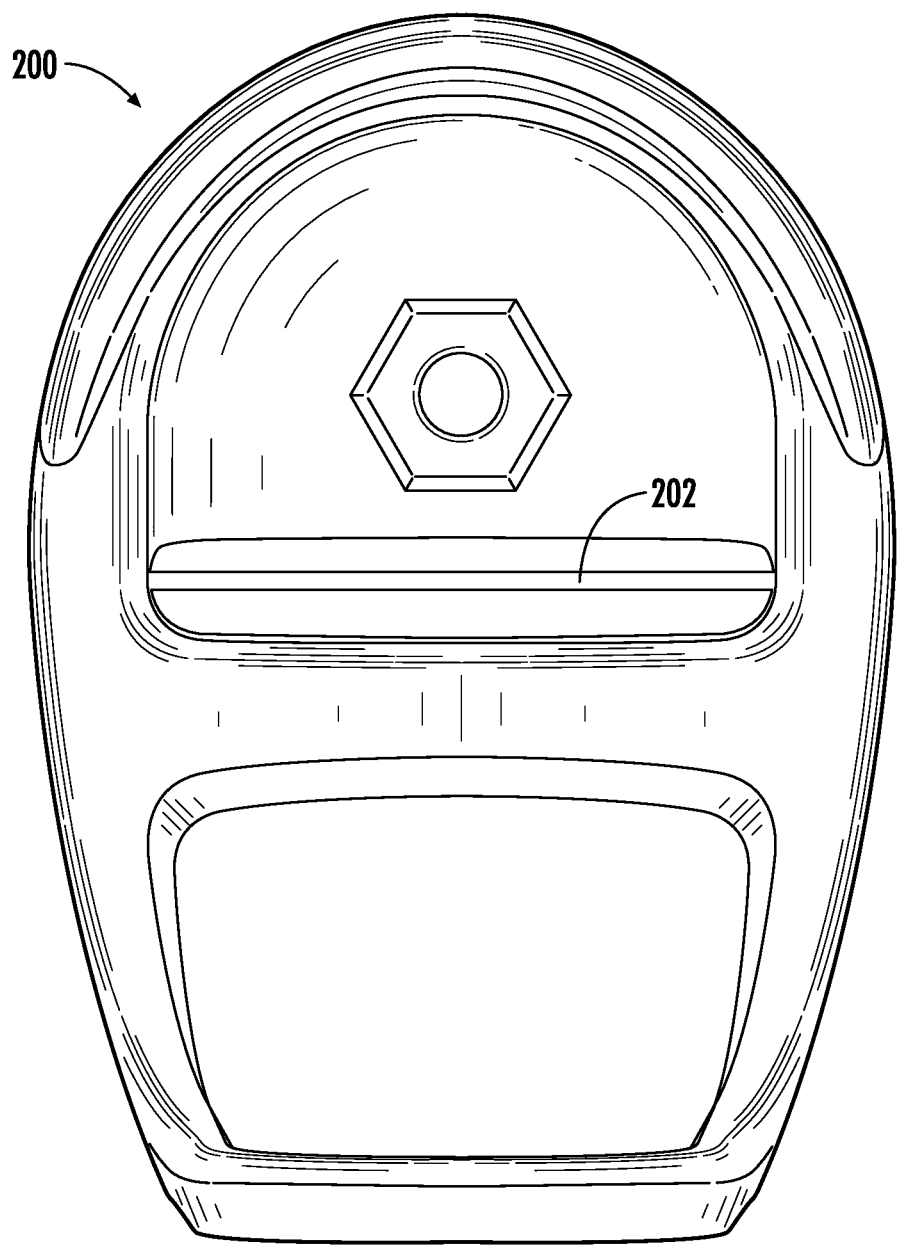
FIG. 6 is a front perspective view of an alternative embodiment of the feed port of the present invention with an alternative obstruction configuration.
Figure 7:
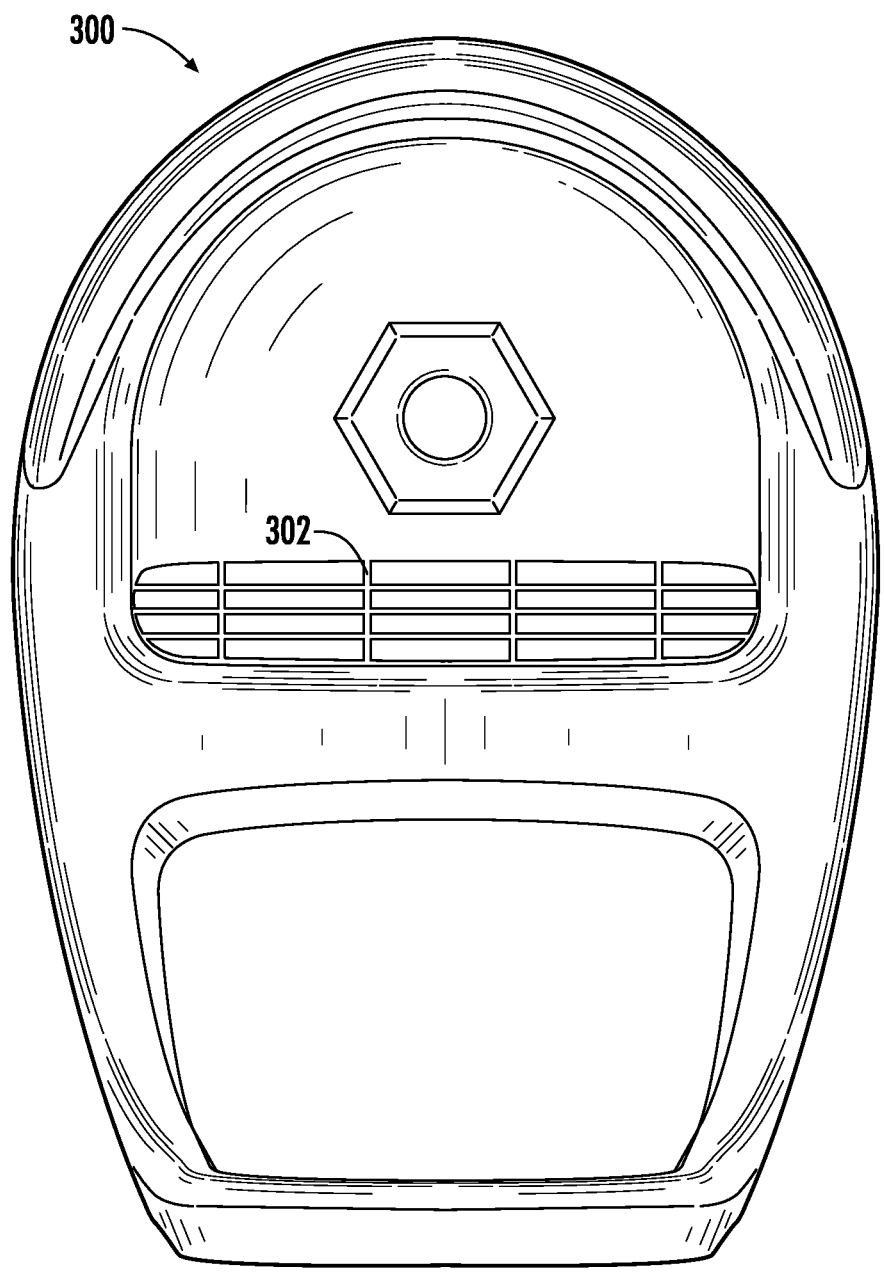
FIG. 7 is a front perspective view of another alternative embodiment of the feed port of the present invention with yet another alternative obstruction configuration.

As above, the preferred embodiment of such an obstruction is in the form of a vertically positioned post, namely one that is approximately perpendicular to the front plane of the feed opening. However, it should be understood that such an obstruction can be in many different forms to carry out the purposes of reducing spillage and preventing small birds from getting stuck. For example, as seen in FIG. 6, the alternative embodiment 200 includes an obstruction in the feed port aperture may be in form of a horizontally positioned post 202. Or, as in FIG. 7, alternative embodiment 300 the obstruction in the feed port aperture may be in the form of a grid array 302, such as an array of molded posts or even mesh material. It is also possible that the obstruction is more than one post that are arranged parallel to one another. The arrays, in parallel, grid or other form, may be oriented in any direction. Still further, instead of a post-like shape, the obstruction may be a plate with a number of smaller apertures therein to permit access to feed by birds while providing the needed obstruction function, as above. It is envisioned that any type of obstruction, while still permitting access to the feed in the feeder by a bird while carrying out the needed functions above, is deemed to be within the scope of the present invention.

Therefore, it can be seen that the present invention provides a unique solution to the problem of providing a feed port with a wider opening that prevents smaller birds from getting their heads stuck in the fee port and to prevent larger birds from spilling seed out of the bird feeders by picking through the seed through movement of their beaks from side to side, yet still allows newer seed blends to flow to the feed port without binding. Because the feed port includes the obstruction in the second opening, it may also have the added advantage in tending to deter squirrels from being able to reach into the bird feeder through the feed port.

It would be appreciated by those skilled in the art that various changes and modifications can be made to the illustrated embodiments without departing from the spirit of the present invention. All such modifications and changes are intended to be within the scope of the present invention.

What is claimed is:

1. A feed port for a bird feeder, comprising:
   a body portion having a front face and a rear face;
   said body portion having a at least one edge defining a first opening through the front face to the rear face of the body portion;
   a shroud extending from the rear face of the body portion and depending downward, the shroud forming a space rear of the first opening, the shroud further defining a second opening circumscribed by a bottom portion of the shroud and the rear face of the body portion, the second opening in fluid connection with the first opening; and
   an obstruction extending across the second opening, the obstruction connected to the bottom portion of the shroud and the rear face of the body portion and adjacent to the first opening.

2. The feed port of claim 1, further comprising a lip extending forward from said body portion and above said first opening.

3. The feed port of claim 1, further comprising a perch extending from said body portion.

4. The feed port of claim 1, wherein said obstruction is a center post.

5. The feed port of claim 4, wherein said center post bisects said second opening in half.

6. The feed port of claim 1, wherein said obstruction comprises a plurality of posts.

7. The feed port of claim 1, wherein said obstruction comprises a grid array.

8. The feed port of claim 1, wherein said obstruction comprises mesh.

9. The feed port of claim 1, wherein said obstruction comprises a plate with a plurality of apertures formed therethrough.

10. The feed port of claim 1, further comprising a raised boss extending rearward from said shroud, said boss having a hex key formed thereon.

11. A bird feeder, comprising:
    a sidewall configured and arranged to hold bird feed therein, said sidewall having at least one feed port thereon;
    said at least one feed port having:
    a body portion having a front face and a rear face;

said body portion having a plurality of edges defining a first opening through the front face to the rear face of the body portion;

a shroud extending from the rear face of the body portion and depending downward, the shroud forming a space rear of the first opening, the shroud further defining a second opening circumscribed by a bottom portion of the shroud and the rear face of the body portion, the second opening in fluid connection with the first opening; and an obstruction extending across the second opening, the obstruction connected to the bottom portion of the shroud and the rear face of the body portion and adjacent to the first opening.

12. The feed port of claim 11, wherein said obstruction is a center post.

13. The feed port of claim 11, wherein said obstruction comprises a plurality of posts.

14. The feed port of claim 11, wherein said obstruction comprises a grid array.

15. The feed port of claim 11, wherein said obstruction comprises mesh.

16. The feed port of claim 11, wherein said obstruction comprises a plate with a plurality of apertures formed therethrough.

\* \* \* \* \*